United States Patent [19]

Garnett

[11] Patent Number: 4,466,511

[45] Date of Patent: Aug. 21, 1984

[54] LEAD SCREW OVERTHRUST PROTECTION

[75] Inventor: Donald W. Garnett, Grand Ledge, Mich.

[73] Assignee: The Olofsson Corporation, Lansing, Mich.

[21] Appl. No.: 287,360

[22] Filed: Jul. 27, 1981

[51] Int. Cl.³ .............................................. B60T 7/12
[52] U.S. Cl. ...................................... 188/134; 192/2; 192/7; 192/141; 310/77
[58] Field of Search ................ 188/134; 192/141, 144, 192/7, 2; 310/77

[56] References Cited

U.S. PATENT DOCUMENTS

| | | | |
|---|---|---|---|
| Re. 21,017 | 2/1939 | Mellon | 192/144 |
| 2,258,477 | 10/1941 | Wright | 192/144 |
| 2,894,610 | 7/1959 | Harrington | 188/134 X |
| 3,327,826 | 6/1967 | Henschke | 192/144 X |
| 3,499,511 | 3/1970 | Bouhot | 192/7 X |
| 3,994,178 | 11/1976 | Hore | 188/134 X |
| 4,111,070 | 8/1978 | Stratienko | 192/141 X |
| 4,275,802 | 6/1981 | de Groot et al. | 188/134 |

Primary Examiner—George E. A. Halvosa
Attorney, Agent, or Firm—Barnes, Kisselle, Raisch, Choate, Whittemore & Hulbert

[57] ABSTRACT

A lead screw is threaded into a lead nut to move the lead nut one way or the other depending on the direction of rotation of the lead screw. The lead screw is held in an operative position by springs which prevent it from moving from its operative position until an excessive overload occurs. Braking disks are positioned on opposite sides of a sheave mounted on the lead screw. Abutments hold the braking disks spaced from the sheave to provide a small clearance when the shaft is in its operative position. When the shaft encounters an excessive overload, it will move axially from its operative position and its rotation will be stopped by one or the other of the braking disks. A yieldable support is provided for the braking disks. In one embodiment the yieldable support is a piston-cylinder assembly. In another embodiment it consists of a set of springs.

10 Claims, 3 Drawing Figures

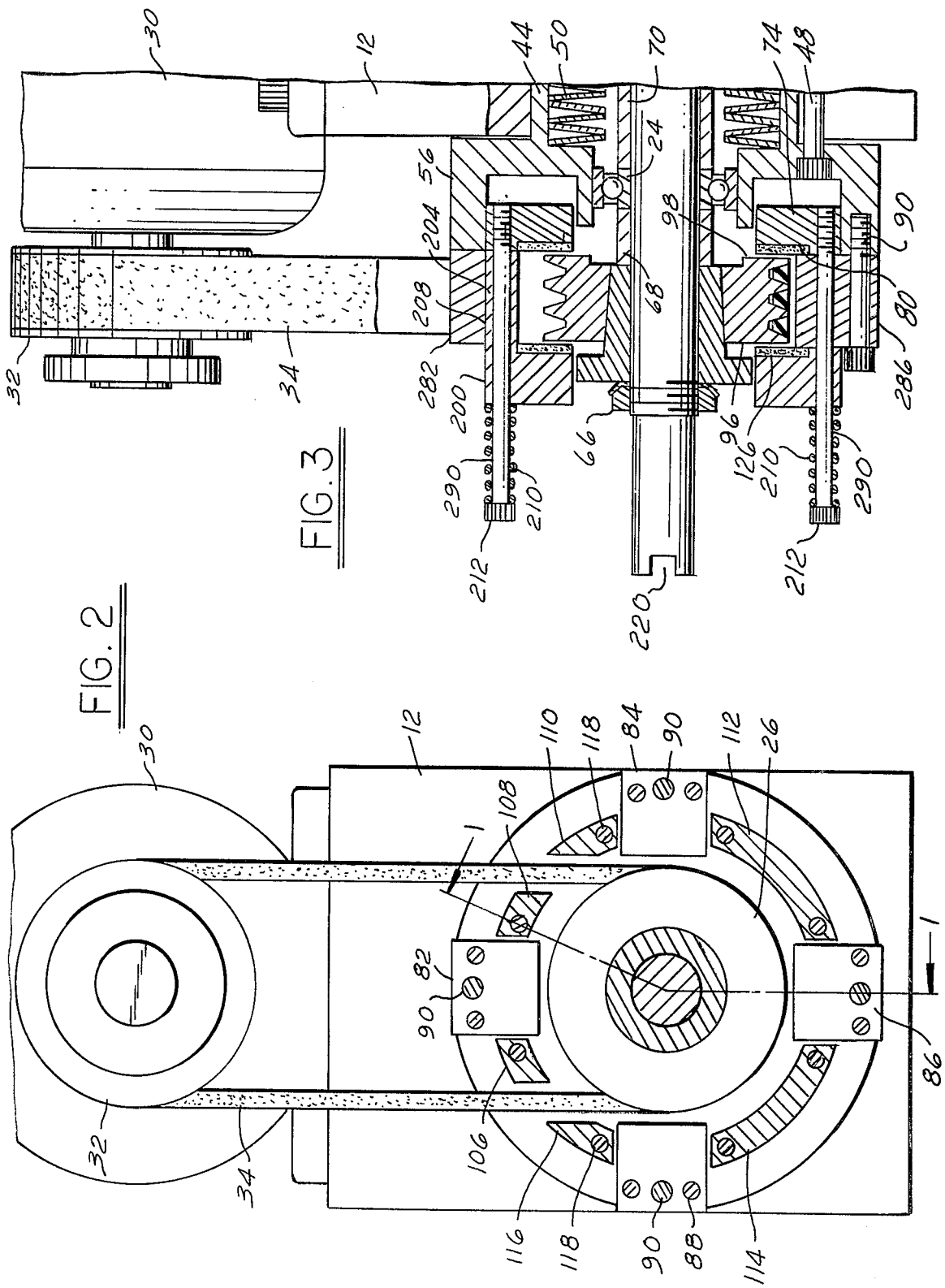

LEAD SCREW OVERTHRUST PROTECTION

This invention relates generally to means for preventing damage to machines due to overloads and refers more particularly to automatic means to safeguard lead screw driven machines from excessive overloads that occur when machine motion is obstructed.

SUMMARY OF THE INVENTION

There are many causes which can and sometimes do lead to catastrophic machine failure, especially in numerically-controlled, servo-driven machines, among which are:

1. Foreign material in the path of travel of a machine member.
2. Electronic failure of the drive circuits to a driving servo motor, causing a runaway condition of the servo motor.
3. Improper programming of an electronic-controlled servo motor.
4. Failure of some mechanical function to properly position a machine member.

The rapid motions of these machines are necessarily accomplished by high inertia energy in the mechanical drives. In a potential wreck situation, this energy must be quickly dissipated before destructive forces occur. The nature of servo drives is for the servo to follow the commands of the controller. As resistance to motion is met, the servo motor increases its output torque to overcome the resistance. Servo torques may increase to a destructive 400% or more above normal in their attempt to follow the servo command. Servo motor driven machine members often move at rates of 400 inches per minute or more. To protect against destructive forces, the motion must often be stopped from high speed motion in 0.010 inches of travel or less after sensing an overload. This time element is often as short as one or two milliseconds.

Servo motor and drive line rotation speeds are commonly 1600 revolutions per minute or more. This rotational energy must be dissipated quickly, often within one revolution or within 30 to 40 milliseconds.

Preferably, the protective device for these conditions should be relatively fool proof and independent of any electronic control that may in itself be the cause of the protential destruction and therefore conceivably non-functional in an emergency.

Following the operation of a safeguard mechanism, the machine may be in a highly stressed condition which creates a safety hazard to an operator attempting to clear it. Preferably then, the safeguard mechanism should be capable of relaxing the machine forces to a safe condition before the intervention of the operator to clear the jam.

An object of this invention is to provide mechanism capable to meeting the above requirements. Other objects will become more apparent as the following description proceeds, especially when considered with the accompanying drawings.

BRIEF DESCRIPTION OF THE DRAWINGS

FIG. 2 is a view partially in elevation and partially in section taken on the line 2—2 in FIG. 1.

FIG. 3 is similar to a portion of FIG. 1, but shows a modification.

DETAILED DESCRIPTION

Figure 1:
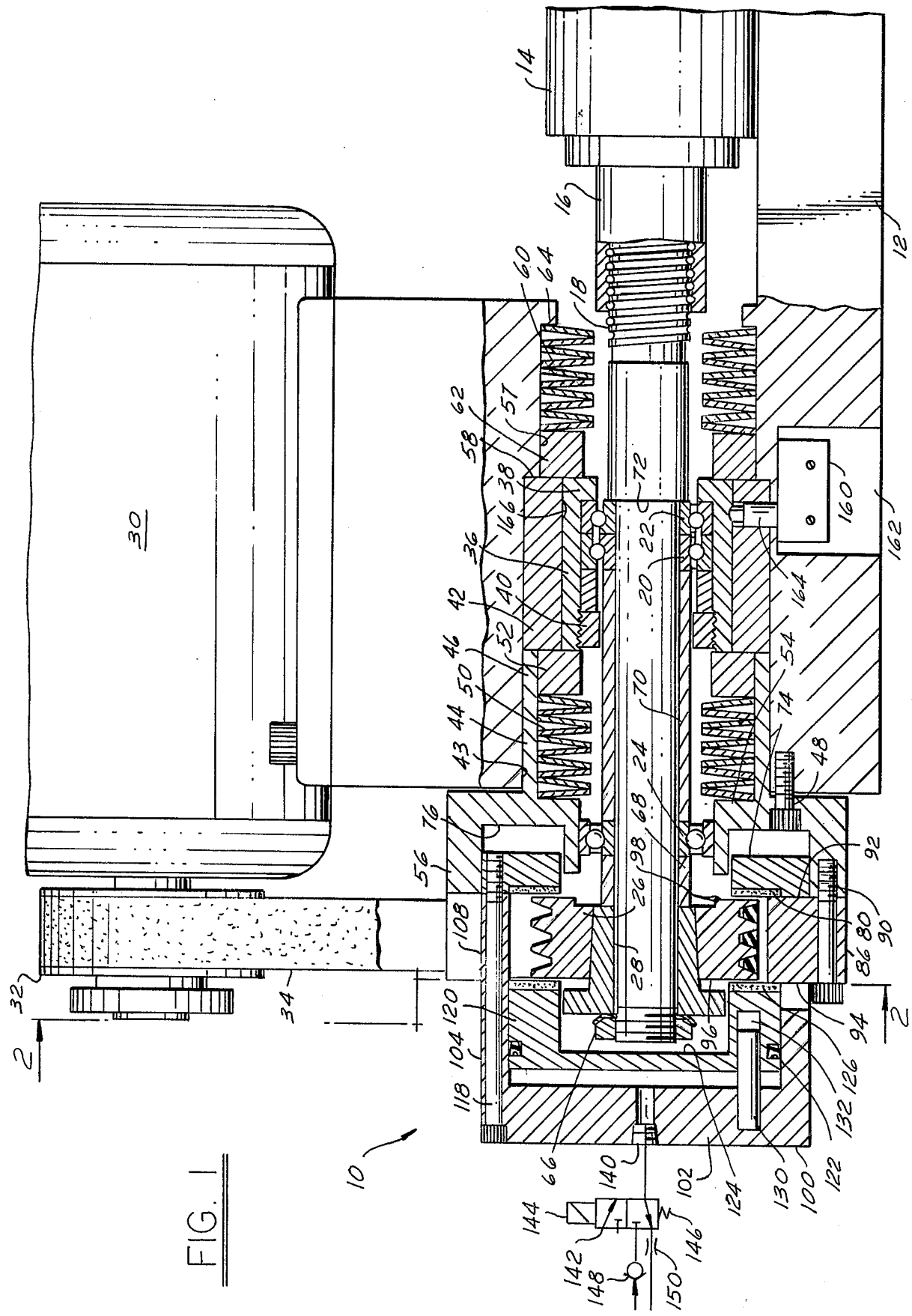
FIG. 1 is a view partially in elevation and partially in section taken on the line 1—1 in FIG. 2, showing a lead screw drive driven by a servo motor and a movable machine member driven by a lead screw.

Referring now particularly to the drawings and especially to FIGS. 1 and 2 thereof, a ball lead screw drive is generally indicated by the numeral 10. A machine base 12 mounts a machine member 14 for reciprocal movement. A lead nut 16 is affixed to the member 14. A ball lead screw 18 is shown threadedly engaged with the lead nut 16 to move the lead nut and machine member 14 one way or the other depending on the direction of rotation of the lead screw.

The midsection of the lead screw 18 is shown mounted for rotation in bearings 20 and 22. The lead screw is mounted in a bearing 24 near the end of the lead screw opposite its threaded end. At the extreme end of the lead screw away from its threaded end, a belt sheave 26 is mounted on the lead screw by a tapered sleeve member 28 forming a wedge lock with the sheave to lock it against rotation relative to the lead screw.

The base 12, at its upper extremity, mounts a drive motor 30. A sheave 32 is mounted on the output shaft of the motor and belts 34 extending around the sheaves 26 and 32 transmit the motor output to the lead screw 18 to rotate the lead screw in one direction or the other depending on the direction of rotation of the motor.

Bearings 20 and 22 are mounted in a bearing cage 36 which is a cylindrical body having an inturned angular flange 38 at one end. The bearings 20 and 22 fit within the cylindrical body of the bearing cage 36 and are locked against the flange 38 by a bearing nut 40 threaded in the cylindrical body. Bearing cage 36 is axially slidably mounted in a cylindrical sleeve 42 which is of exactly the same length as the bearing cage, as clearly seen in FIG. 1. Sleeve 42 is received in a cylindrical opening 43 in base 12 which opening is concentric with shaft 18. Sleeve 42 is locked therein against axial movement by retainer 44 which has a cylindrical body portion 46 fitted within the cylindrical opening 43 of the base. The end of body portion 46 bears against one end of sleeve 42. The retainer 44 is bolted to the base by bolts 48.

Contained within the cylindrical body portion 46 of the retainer 44 is a series or stack of Belleville springs 50 held in compression against a flat circular washer 52 fitted within the body portion 46 at one end and shoulder 54 of the annular enlargement 56 of the retainer 44. The washer 52 contacts the adjacent ends of the cage 36 and sleeve 42.

The base 12 has a second cylindrical opening 57 of smaller diameter than but concentric with opening 43. Openings 43 and 57 are separated by shoulder 58, and contained within the opening 57 is a second series or stack of Belleville springs 60 held in compression against a flat circular washer 62 at one end and the shoulder 64 of the base 12 at the other end. The washer 62 bears against the adjacent ends of the cage 36 and sleeve 42.

Washers 52 and 62 are resiliently pressed by the springs 50 and 60 against the opposite ends of sleeve 42 and also against the opposite ends of bearing cage 36 which is of the same length as sleeve 42, thereby trapping the bearing cage 36 against axial movement unless axial forces exceed the preloaded compression force of the Belleville spring stacks 50 and 60. In this trapped position, the ends of the cage are held flush with the ends of sleeve 42 by washers 52 and 62.

The inner races of the bearings 20, 22 and 24 and the sleeve 26 are affixed to the lead screw and secured in position thereon so as to be restrained from axial movement by means of a nut 66 threaded on the end of the shaft and spacer sleeves 68 and 70 between the tapered sleeve member 28 and the inner race of bearing 24 and between the inner races of bearings 24 and 20. It will be noted that the bearing 20 is in contact with the bearing 22 and that the bearing 22 abuts a shoulder 72 on the shaft.

A circular washer-like disc 74 at the inner side of sheave 26 is axially slidably retained in a cylindrical recess or opening 76 in the enlargement 56 of the retainer 44. The outer cylindrical wall of recess 76 in which disc 74 slides in concentric with shaft 18, so that disc 74 is also concentric with shaft 18. This disc 74 has a recess in which is secured a circular brake element or disc 80.

Four segment blocks 82, 84, 86 and 88 are affixed in a circular arrangement at 90° intervals to the enlargement 56 of the retainer 44 by bolts 90. These blocks are of the same size and shape and incircle the sheave 26. Their thickness, that is the distance between their inner faces 92 and outer faces 94, is slightly greater than the thickness of sheave 26. Blocks 82–88 are so positioned that their inner faces 92 which are coplanar, are disposed a slight distance inwardly of the inner face of sheave 26, and their outer faces 94, which also are coplanar, are disposed a slight distance outwardly of the outer face of sheave 26.

Cylinder 100 has a closed outer end 102 and a cylindrical wall or skirt 104 which is concentric with screw 18 and is longitudinally slotted at the end away from the closed end 102 to provide skirt segments 106, 108 110, 112, 114 and 116. These skirt segments straddle the blocks 80–88 as shown in FIG. 2 with segments 106 and 108 straddling block 82, segments 110 and 112 straddling block 84, segments 112 and 114 straddling block 86, and segments 114 and 116 straddling block 88. Hence the cylinder is restrained from rotating. These skirt segments of the cylinder are secured to the disc 74 by bolts 118, disc 74 being thereby held coaxial with the cylinder.

A piston 120 is reciprocable within cylinder 100 at the outer side of sheave 26 and has a seal 122 against fluid leakage. The piston 120 has its inner end recessed where indicated at 124 to clear the outer end of the shaft 18. A second circular brake element or disc 126 is axially slidably received in cylinder 100 and abuts the skirt face of the piston which surrounds recess 124. Blocks 82–88 extend through the spaces between the skirt segments and into the cylinder 100. Brake elements 80 and 126 confront both the radially outer extremity of sheave 26 and the radially inner extremities of blocks 82–88.

A pin 130 affixed within the head of cylinder 100 is slidably received in a hole 132 in the piston to prevent the piston from rotating within the cylinder.

An air port 140 in the head of cylinder 100 receives compressed air from a suitable source through a three way valve 142 when the solenoid 144 is electrically energized to overcome spring 146. Air is prevented from leaving the cylinder by a check valve 148.

When solenoid 144 is deenergized spring 146 shifts the valve 142 to the position shown in FIG. 1, blocking further entrance of compressed air to cylinder 100 and exhausting the air contained within the cylinder through a restricted outlet 150.

When compressed air is supplied to cylinder 100, piston 120 forces brake element 126 into abutment with faces 94 of segment blocks 82–88 and cylinder 100 draws disc 74 and its brake disc 80 into abutment with faces 92 of the blocks. In the normal position of the parts, the brake elements 80 and 126 are spaced a slight distance from the opposite faces of the sheave. When the servo drive is operated, solenoid 144 is energized to thus supply compressed air through valve 142 to cylinder 100.

A limit switch 160 is received in an opening 162 in the base 12 and limit switch operator 164 is received within an opening in sleeve 42. An annular groove 166 in the outer surface of cage 36 receives the tip of the limit switch operator 164. Any axial motion of cage 36 will move groove 166 out of register with the tip of switch operator 164 depressing the switch operator 164 and causing the limit switch to open a normally closed circuit.

In operation, the servo motor 30 is electrically driven in a manner prescribed by a controller (not shown). By means of sheave 32 belts 34 and sheave 26, the lead screw 18 is caused to rotate. The lead nut 16 and movable machine member 14 are thereby caused to traverse right or left, depending on the direction of rotation of lead screw 18. As machine member 14 meets resistance to motion, the serve motor automatically increases its torque output in response to its servo command. The axial thrust against lead nut 16 also increases to overcome the motion resistance of machine member 14. If the axial resistance to motion becomes abnormally high and exceeds the preload in either spring stack 50 or 60, cage 36 will slide in sleeve 42 allowing the machine member 14 to stop and lead screw 18 to extrude (move axially) while still rotating. Since the inertia of the relatively slow moving machine member 14 is low compared to the rotational inertia of the high RPM drive system, the machine forces, created by sudden increase in axial thrust, need cope with only a small portion of the total drive system inertia, and destructive forces can be avoided.

Since the distance that the lead screw 18 may be axially shifted is obviously restricted by spring stacks 50 and 60 and other machine limitations, the rotation of the drive system must be quickly stopped and its relatively high inertia energy dissipated, preferably within one revolution. If the excessive resistance to motion occurs during counter-clockwise rotation (FIG. 2) the axial shift of lead screw 18 begins, and sheave face 96 is brought into brake contact with brake disc 126. The time element required to take up this clearance is very short, for instance, 1/40 of a revolution which at 1600 RPM is less than 1 millisecond. Since this is truly a mechanical system, no electrical failures or delays are involved and brake engagement is immediately assured.

Brake disc engagement immediately causes a high braking torque as influenced by the piston thrust within cylinder 100. Rotation of cylinder 100 and its attached disc 74 is prevented by the slotted engagement of the cylinder skirt 104 with blocks 82–88. Rotation of the piston 120 is prevented by pin 130. As axial shift of lead screw 18 continues, brake disc 126 is lifted from abutment on face 94 of segments 82–88 by sheave face 96.

Air trapped between the piston 120 and cylinder 100 cannot escape past check value 148 and is therefore compressed by relative motion of the piston 120 and cylinder 100. As the air pressure rapidly rises, the braking effort of disc 126 also rapidly increases.

For instance, an initial air pressure of 60 PSI may build to 180 PSI when the piston head clearance is sufficiently reduced. This high braking torque is capable of quickly dissipating the rotational inertia energy and stalling the servo motor even though it may still be under power.

It should be noted that clockwise rotation as viewed in FIG. 2 will cause the lead screw to axially move to the right (FIG. 1) when machine member 14 meets with excessive resistance to motion. Engagement of sheave face 98 with brake disc 80 causes the cylinder 100 to move to the right with the piston stationary as held by the abutment of brake disc 126 on face 94 of segments 82–88. Brake effort in this case is caused by disc 80. Air is again compressed within the cylinder 100 for rapid braking. In this manner, machine member 14 is protected against excessive forces in both directions of movement.

As cage 36 moves axially in either direction, one of the sides of groove 166 will engage operator 164 of limit switch 160 and open a normally closed electrical circuit. This electrical fault signal is wired (not shown) to deenergize solenoid 144 of valve 142. The valve 142 is spring returned to dump the air from the chamber of cylinder 100. The escapement rate of the air is limited by the restrictive opening 150. Consequently very little air escapes during the short term braking effort. The limit switch 160 is also used to electrically deenergize all machine drives that may be involved in potential destruction including servo motor 30.

At this point of the shut down cycle, one of the spring stacks 50 or 60 is considerably compressed and its pressure is felt at the point of machine obstruction. If the operator were to try to remove the obstruction, the machine member 14 could snap ahead under the influence of the compressed spring stack causing injury. However, as the air continues to escape past restrictive opening 150, the air pressure in cylinder 100 decreases; therefore the braking effort diminishes until such time that the pressure of spring stack 50 or 60 may back drive the lead screw and servo motor. Cage 36 is therefore allowed to return to its normal seated position and the safety hazard of the pressure on the machine obstruction is automatically removed. Removal of the brake effort also enables the use of the servo motor 30 to further retract the machine member away from its obstruction.

FIG. 3, in a section similar to FIG. 1, shows a modification which differs substantially only in that the air cylinder, piston and air circuitry are replaced by a washer or ring 200 having a cylindrical wall or skirt 204 which is longitudinally slotted at the end away from the ring to provide skirt segments. The cylindrical wall 204 and segments in FIG. 3 are like the cylindrical wall 104 and segments 106–116 in FIGS. 1 and 2, although only one segment 208 is shown. The skirt segments straddle the segment blocks (like the segment blocks in FIGS. 1 and 2 but only two of which are shown at 282 and 286 in FIG. 3) in the same manner as in FIG. 2. Bolts 290 are secured to disc 74 and the ring 200 is capable of sliding on the bolts. The bolts 290 are parallel to the screw 18 and hence the ring 200 is maintained concentric with the screw. The ring 200 has a recess in which is secured the braking element or disc 126. The braking discs 126 and 80 bear the same relationship to the sheave 26 and segment blocks as in the embodiment of FIGS. 1 and 2.

Springs 210 on bolts 290 are compressed between bolt heads 212 and the ring 200 to draw the ring 200 and disc 74 toward one another causing the braking elements 126 and 80 to abut the opposite faces of the segment blocks. Thus the braking force supplied by the cylinder 100 and piston 120 in FIGS. 1 and 2 when the preload in one of the spring stacks 50 or 60 is exceeded is supplied by springs 210 in FIG. 3. The operation of the device of FIG. 3 is similar to that of FIGS. 1 and 2. However, the ability to automatically relieve the brake torque is not available with the modification of FIG. 3. Therefore the lead screw 18 is extended and provided with a wrench slot 220 so that the lead screw may be manually backed off after a jam situation has occurred. Alternatively, bolts 290 could be backed off to relieve the compression load in springs 210.

I claim:

1. In apparatus having a movable member, a drive including a rotatable shaft threaded to said member and operative to move said member when rotated, power means for rotating said shaft, mechanism for protecting the apparatus from damage due to excessive overloads when movement of said member is obstructed, said mechanism comprising means supporting said shaft for axial movement, resilient means locating said shaft axially in operative position and preventing axial movement of said shaft in both directions from said operative position under ordinary operating conditions when movement of said member is not obstructed and said shaft is subjected to axial loading below that which is excessive, said resilient means including a first spring means acting axially in one direction against said shaft and in the same direction against a first fixed abutment, said resilient means also including a second spring means acting in the opposite direction against said shaft and in said opposite direction against a second fixed abutment, said shaft during rotation being caused to move axially from its operative position against the force of one of said spring means when movement of said member is obstructed to create an excessive overload but without assist from the other of said spring means the force of which is blocked by the fixed abutment against which it acts, braking elements spaced axially in relation to said shaft on opposite sides of a part on said shaft, one braking element or the other being engaged by said part on said shaft when said shaft moves axially from its operative position to stop said shaft from rotating, and yieldable brake support means for said braking elements resisting with a yielding pressure movement of said braking elements when engaged by said part on said shaft.

2. Structure as defined in claim 1, including abutment means for said braking elements holding them axially spaced from said part on said shaft to provide a small clearance when said shaft is in its operative position, said braking elements moving away from said abutment means when engaged by said part on said shaft.

3. Structure as defined in claim 2, wherein said yieldable brake support means increases its resistance in response to movement of either braking element away from said abutment means.

4. Structure as defined in claim 3, wherein said yieldable brake support means comprises a piston-cylinder assembly having a piston connected to one of said braking elements and a cylinder connected to the other with a chamber in said cylinder the volume of which decreases in response to movement of either of said braking elements away from said abutment means, and fluid under pressure in said chamber.

5. Structure as defined in claim 4, including means for automatically relieving the pressure in said chamber immediately following axial movement of said shaft sufficiently to cause its rotation to be stopped by one of said braking elements.

6. Structure as defined in claim 5, wherein said means for automatically relieving the pressure in said chamber includes a solenoid-operated valve, and a limit switch for said solenoid operated by the axial movement of said shaft.

7. Structure as defined in claim 6, wherein said limit switch when operated deactivates said power means.

8. Structure as defined in claim 3, wherein said yieldable brake support means includes spring means.

9. Structure as defined in claim 8, including means by which said shaft can be manually returned to its operative position following axial movement therefrom.

10. Structure as defined in claim 1, including means by which said shaft can be manually returned to its operative position following axial movement therefrom.

* * * * *